(12) United States Patent
Vishwakarma et al.

(10) Patent No.: US 11,227,222 B2
(45) Date of Patent: Jan. 18, 2022

(54) SYSTEM AND METHOD FOR PRIORITIZING AND PREVENTING BACKUP FAILURES

(71) Applicant: EMC IP Holding Company LLC, Hopkinton, MA (US)

(72) Inventors: Rahul Deo Vishwakarma, Bengaluru (IN); Shelesh Chopra, Bangalore (IN); Parmeshwr Prasad, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/930,155

(22) Filed: Jul. 15, 2020

(65) Prior Publication Data

US 2021/0374568 A1 Dec. 2, 2021

(51) Int. Cl.
| | | |
|---|---|---|
| *G06F 11/00* | (2006.01) | |
| *G06N 5/04* | (2006.01) | |
| *G06F 11/07* | (2006.01) | |
| *G06F 11/14* | (2006.01) | |
| *G06N 20/00* | (2019.01) | |

(52) U.S. Cl.
CPC ............. *G06N 5/04* (2013.01); *G06F 11/079* (2013.01); *G06F 11/0727* (2013.01); *G06F 11/0751* (2013.01); *G06F 11/1451* (2013.01); *G06N 20/00* (2019.01); *G06F 11/0793* (2013.01); *G06F 2201/82* (2013.01)

(58) Field of Classification Search
CPC ............. G06F 11/0727; G06F 11/0751; G06F 11/1458; G06F 11/1448; G06F 11/0793
See application file for complete search history.

(56) References Cited

U.S. PATENT DOCUMENTS

| | | | | |
|---|---|---|---|---|
| 2013/0104230 | A1* | 4/2013 | Tang | .............. H04L 63/1458 726/23 |
| 2019/0278661 | A1* | 9/2019 | Mehta | ............. G06F 11/1451 |

* cited by examiner

*Primary Examiner* — Katherine Lin
(74) *Attorney, Agent, or Firm* — Chamberlain, Hrdlicka, White, Williams & Aughtry (57) ABSTRACT

Techniques described herein relate to a method for forecasting backup failures. Such techniques may include: obtaining data items associated with backup jobs; writing entries in a time series database, the entries comprising successful backup jobs and failed backup jobs; performing a first analysis to predict future failed backup jobs based on the entries in the time series database to obtain a future backup job failure predictions; performing a second analysis to determine a confidence prediction for each of the future backup job failure predictions; ranking the future backup job failure predictions based on the second analysis; performing a third analysis to determine at least one variable leading to each of the future backup job failure predictions; and sending results of the second analysis and the third analysis to an administrator of a data domain.

18 Claims, 5 Drawing Sheets

SYSTEM AND METHOD FOR PRIORITIZING AND PREVENTING BACKUP FAILURES

BACKGROUND

Computing devices often store data on one or more storage devices included in and/or operatively connected to the computing device. Such data may be backed up from time to time using scheduled or user-initiated backup jobs. Though backup jobs often succeed, the may, at times, fail.

SUMMARY

In general, embodiments described herein relate to a method for forecasting backup failures. The method may include: obtaining a plurality of data items associated with a plurality of backup jobs; writing a plurality of entries in a time series database, the plurality of entries comprising successful backup jobs and failed backup jobs; performing a first analysis to predict a plurality of predicted future failed backup jobs based on the plurality of entries in the time series database to obtain a plurality of future backup job failure predictions; performing a second analysis to determine a confidence prediction for each of the plurality of future backup job failure predictions; ranking the plurality of future backup job failure predictions based on the second analysis; performing a third analysis to determine at least one variable leading to each of the plurality of future backup job failure predictions; and sending results of the second analysis and the third analysis to an administrator of a data domain.

In general, embodiments described herein relate to a non-transitory computer readable medium comprising computer readable program code, which when executed by a computer processor enables the computer processor to perform a method for forecasting backup failures. The method may include: obtaining a plurality of data items associated with a plurality of backup jobs; writing a plurality of entries in a time series database, the plurality of entries comprising successful backup jobs and failed backup jobs; performing a first analysis to predict a plurality of predicted future failed backup jobs based on the plurality of entries in the time series database to obtain a plurality of future backup job failure predictions; performing a second analysis to determine a confidence prediction for each of the plurality of future backup job failure predictions; ranking the plurality of future backup job failure predictions based on the second analysis; performing a third analysis to determine at least one variable leading to each of the plurality of future backup job failure predictions; and sending results of the second analysis and the third analysis to an administrator of a data domain.

In general, embodiments described herein relate to a system for forecasting backup failures. The system may include: a plurality of client devices each including a processor, a memory, and a persistent storage device; a plurality of storage devices; and a data domain management controller operatively connected to the plurality of client devices and the plurality of storage devices. The data domain management controller may be configured to: obtain a plurality of data items associated with a plurality of backup jobs; write a plurality of entries in a time series database, the plurality of entries comprising successful backup jobs and failed backup jobs; perform a first analysis to predict a plurality of predicted future failed backup jobs based on the plurality of entries in the time series database to obtain a plurality of future backup job failure predictions; perform a second analysis to determine a confidence prediction for each of the plurality of future backup job failure predictions; rank the plurality of future backup job failure predictions based on the second analysis; perform a third analysis to determine at least one variable leading to each of the plurality of future backup job failure predictions; and send results of the second analysis and the third analysis to an administrator of a data domain.

Other aspects of the embodiments disclosed herein will be apparent from the following description and the appended claims.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures.

In the below description, numerous details are set forth as examples of embodiments described herein. It will be understood by those skilled in the art and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for predicting future backup job failures, determining a confidence level of such predictions, ranking the predictions based on the confidence levels, and determining certain variables that are likely to be contributing factors in the future backup job failure.

Computing devices often have information of many types that are to be backed up to other storage devices. Such information includes, but is not limited to, databases, file systems, state information, anything else that may need to be backed up, etc. The system of computing devices may include client devices, which are the sources of the data to be backed up, backup storage devices, which backups of the data, and one or more data domain management controllers (e.g., a Dell EMC Data Domain System Manager), which orchestrate the backup of the data from the client devices to the backup storage devices. The system including the aforementioned devices may be referred to as a data domain (e.g., a Dell EMC Data Domain).

In one or more embodiments, information relating to backup jobs is obtained. In one or more embodiments, the information is obtained from the clients for which the backup jobs are being performed, and from the data domain storage devices to which the data is being backed up. In one or more embodiments, the data per backup job is stored as entries in a time series database. A portion of the entries may include successful backup jobs, which may include all data items for the backup job and previous backup jobs for the information being backed up. Another portion of the entries may be for failed backup jobs. Such entries may include information for the series of backups performed prior to a certain time frame, which may be configured by an administrator. For example, an administrator may configure a data domain system implementing embodiments disclosed herein to include in the time series database, for failed backup jobs, information that existed 10 or more minutes prior to the failure, discarding information that is more recent that the ten-minute time window.

In one or more embodiments, one or more methods of machine learning may be used to make a prediction as to whether a given backup job (i.e., a job for performing a backup of client data) will fail within a certain time frame (i.e., a time window). Such a time window may be set, for example, by an administrator of a data domain. One non-limiting example of such a machine learning algorithm is a nearest neighbor algorithm.

In one or more embodiments, any machine learning algorithm may be provided a training data set that includes any number of data items associated with backup jobs. Such a training data set may be used for the machine learning algorithm to predict whether a planned backup job is likely to fail or not. Such a prediction may be made, for example, by calculating a score based on the data items, and comparing the score to one or more threshold scores, with the outcome of the comparison(s) determining whether the prediction is that the backup job is or is not likely to fail within the time window.

However, in one or more embodiments, the prediction may or not be correct, and the machine learning algorithm does not provide any additional insight as to how likely the fail-or-not prediction is correct. Therefore, in one or more embodiments, additional analysis is performed to provide additional information that provides insight into the likelihood (i.e., a confidence level) that the prediction is correct. Specifically, one or more embodiments described herein perform an additional analysis that includes comparisons of the prediction with sets of data that include previous predictions that a backup job will fail. Such comparisons may be used to determine probabilities indicating how similar the current prediction is to the set of previous predictions using the data items associated with the backup job being assessed and the set of backup jobs for which a failure was previously predicted.

In one or more embodiments, such additional analysis to determine a set of probabilities may be performed using a transductive confidence machine. In one or more embodiments, a confidence machine generates a confidence level that a prediction will be correct. For example, for a given time window, a confidence machine may determine that a prediction that a backup job will fail has a 95% probability of being correct, while another prediction only has a 48% probability of being correct within the time window. Any suitable probability classification scheme may be used without departing from the scope of embodiments described herein. In one or more embodiments, the confidence analysis makes separate predictions as to the confidence that a failure prediction for a given backup job will be correct. In one or more embodiments, the confidence levels of whether backup jobs that are predicted to possibly fail are ranked, with the highest confidence level being at the top of the ranking, and the other predicted failures being ranked in a descending manner thereafter.

In one or more embodiments, once a ranked list of predicted failures based on confidence levels is generated, an additional analysis is performed to determine what data items relating to the backup job are likely to contribute to the future failure of each backup job on the ranked list. In one or more embodiments, such additional analysis is performed using an exchangeability analysis. In one or more embodiments, an exchangeability analysis assesses a set of data and determines to what degree data points therein deviate from other data points therein (i.e., whether the data points are relatively "exchangeable"), and a value is assigned relative to a threshold.

For example, for a given data item, the series of data points for that data item may be assessed. If all data items are of similar value, then a value of less than one may be assigned for that data item, which means it is unlikely to be a contributing factor to the future failure of a backup job. However, a different data item for a backup job may be similarly assessed, and a determination may be made that the data points differ (e.g., are getting progressively higher than expected), leading to an assignment of a value greater than one. In one or more embodiments, any data item (i.e., variable) for which the threshold value (e.g., one) is exceeded is selected as a possible cause of a predicted future failure of a backup job.

In one or more embodiments, the outcome of the aforementioned analyses yields a set of data that includes, for a set of future backup jobs, a client device identifier, a backup job identifier, a prediction of failure, a confidence level for the prediction, and a set of variables (i.e., data items) that may contribute to the future failure. Such a set may be in a ranked order of highest to lowest confidence level.

In one or more embodiments, the set of data produced by and collected from the aforementioned analyses is provided to an administrator of a data domain. For example, the set of data may be sent to one or more computing devices used to generate a graphical user interface (GUI) to be displayed to a data domain administrator. In one or more embodiments, the administrator may use the presented set of data to perform a remedial action relative to one or more of the backup jobs on the list that are predicted to fail within the time window.

For example, an administrator may discern that the potential failure of a future backup job within a ten-minute time frame is ranked at the top of the list with a 97% confidence level that the predicted failure is correct, and that the variable that is likely to contribute to that failure is the fact that garbage collection is occurring for the backup storage device to which the backup job is intended to back up the client data. Accordingly, the administrator may proactively disable garbage collection services to prevent the failure of the backup job. As another example, the administrator may discern that many or all of the predicted failures on the ranked list have a variable (i.e., data item) in common that is listed as a contributing factor to the future predicted backup job failures. For example, many of the predicted failures may include a data item that they are running an older version of an operating system. Accordingly, to prevent future possible backup job failures, the administrator may update all systems to a current version of the operating system.

Figure 1:
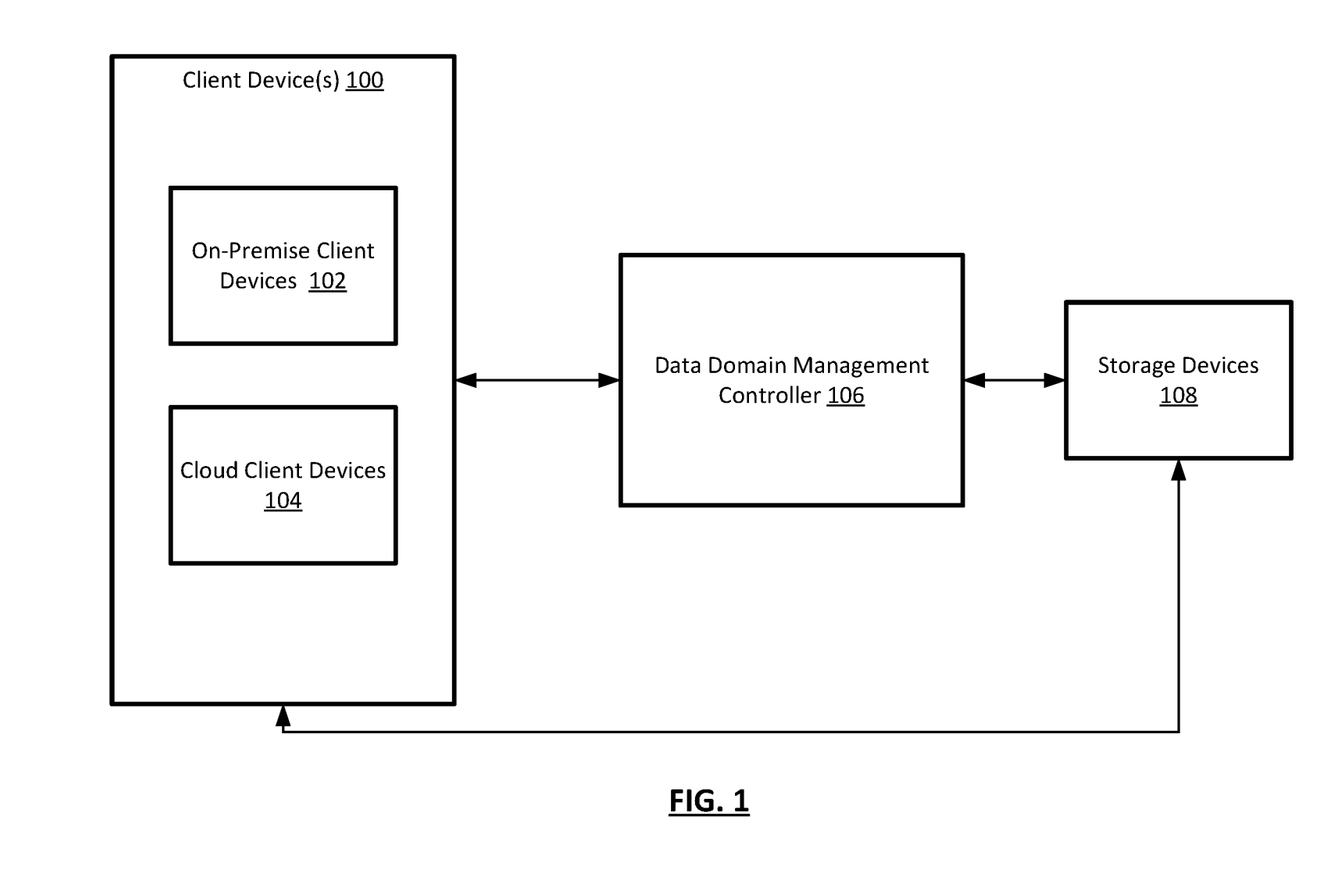
FIG. 1 shows a diagram of a system in accordance with one or more embodiments of the invention.

FIG. 1 shows a diagram of a system in accordance with one or more embodiments described herein. The system may include any number of client devices (100), which may exist within one or more cloud computing environments (e.g., cloud client devices (104)) or be located on the premises of a given entity (e.g., on-premise client devices (102)). The client devices (100) may be operatively connected to any number of storage devices (108) for storing backups. Both the client devices (100) and the storage devices (108) may be operatively connected to one or more data domain management controllers (e.g., data domain management controller (106)) that orchestrates backup of client data to storage devices (108). Each of these components is described below.

In one or more embodiments, a client device (100) is a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices, which may collectively be referred to as a computing device. Other types of computing devices may be used without departing from the scope of the invention.

In one or more embodiments, a set of client devices (100) may form all or a portion of a data domain. In one or more embodiments, a data domain is any set of client devices (100) for which backup services are performed, such as, for example, data backup, disaster recovery, backup data deduplication, etc.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, client devices (100) may be located in any of a variety of locations. For example, certain sets of client devices (100) may be located at one or more locations of a given entity (e.g., a company) and may be referred to as on-premise client devices (102). Other client devices (100) may be located with one or more cloud service providers, and may be referred to as cloud client devices (104). In one or more embodiments, any collection of client devices in any or all such locations are collectively referred to as client devices (100).

In one or more embodiments, client devices (100) are operatively connected to a data domain management controller (106). In one or more embodiments, a data domain management controller (106) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, a data domain management controller (106) includes functionality to obtain data items relating to client data backup jobs from client devices (100) and storage devices (108). Such data items may include, but are not limited to: storage capacity; system model; operating system version information; a set of data collections and/or types to be backed up; whether or not data is encrypted by the client; whether or not data is to be encrypted when stored by a storage device; backup media type (disk, tape, etc.); whether or not garbage collection services are running; number of concurrent backups from clients and/or to storage devices; storage characteristics (e.g., information about type of media used for backup, age of media, various attributes of the media, etc.); system model information (e.g., cluster information, generation of system, machine check exception history); information regarding updates and fixes made to an operating system after deployment of the operating system; and/or backup set and encryption engine information (e.g., AES, TME, MKTME, algorithms used, etc.). Other types of data items may be used without departing from the scope of embodiments described herein. Such data items may be stored by the data domain management controller (106) in a time series database and classified, per backup job, as either successful (i.e., the backup job was a success), or failed (i.e., the backup job was a failure).

In one or more embodiments, a data domain management controller (106) also includes functionality, using the aforementioned data items, to perform a predictive analysis (e.g., using a machine learning algorithm) to predict whether backup jobs for backing up data from client devices (100) to backup storage devices (108) are likely to fail within a given time window. Additionally, a data domain management controller, using the aforementioned data items, may include functionality to assign a confidence level (e.g., using a transductive confidence machine) to the aforementioned predictions. Additionally, the data domain management controller, using the aforementioned data items, may include functionality to analyze the predicted backup job failures (e.g., using martingales to perform an exchangeability test) to determine what data items associated with a backup job are not exchangeable, and thus qualify as candidate data items (i.e., variables) that may lead to the predicted future failure of the backup job. Data domain management controllers (106) are discussed further in the description of FIG. 2, below.

In one or more embodiments, the client devices (100) and the data domain management controller are operatively connected to storage devices (108). In one or more embodiments, a storage device (108) is also a computing device. In one or more embodiments, a computing device is any device or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., SSDs, HDDs (not shown)), one or more physical interfaces (e.g., network ports, storage ports) (not shown), any number of other hardware components (not shown) and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a storage device (e.g., a disk drive array, a fibre channel storage device, an iSCSI storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any of all of the aforementioned examples may be combined to create a system of such devices. Other types of computing devices may be used without departing from the scope of the invention.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the storage devices (108) include functionality to store backup copies of data of any type for which the source is any of the client devices (100)

While FIG. 1 shows a configuration of components, other configurations may be used without departing from the scope of embodiments described herein. For example, the client devices may all be located at a same location, located at two or more on-premise locations of an entity, all located in cloud locations provided by a cloud services provider, and/or any combination thereof. As another example, there may be any number of devices that collectively form the data domain management controller. As another example, there may be any number of storage devices for storing backup data from backup jobs. As another example, any or all of the components shown in FIG. 1 may be located at a same location, or located at separate locations in any combination. Accordingly, embodiments disclosed herein should not be limited to the configuration of components shown in FIG. 1.

Figure 2:
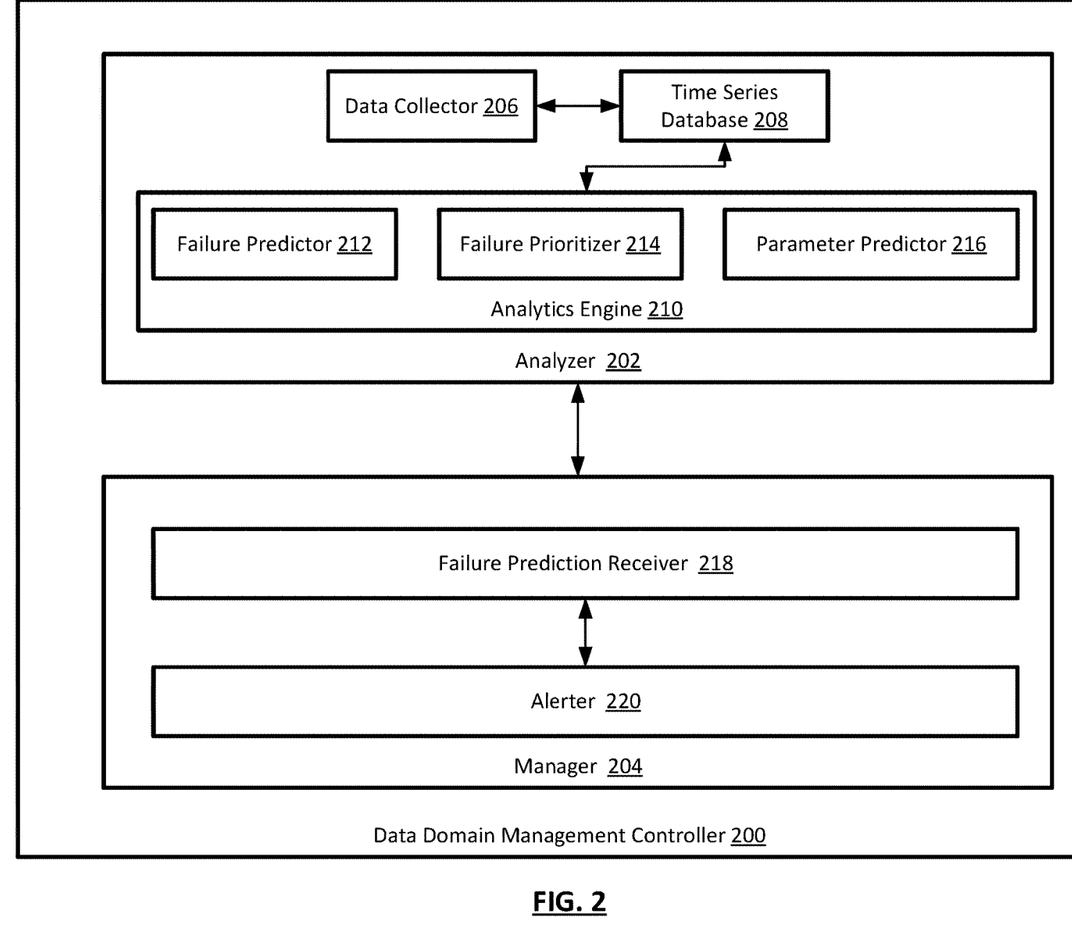
FIG. 2 shows a diagram of a data domain manager in accordance with one or more embodiments of the invention.

FIG. 2 shows a diagram of a data domain management controller (200) in accordance with one or more embodiments described herein. The data domain management controller (200) may include an analyzer (202). The analyzer may include a data collector (206), a time series database (208), and an analytics engine (210). The analytics engine (210) may include a failure predictor (212), a failure prioritizer (214), and a parameter predictor (216). The data domain management controller (200) may also include a manager (204). The manager may include a failure prediction receiver (218) and an alerter (220). Each of these components is described below.

In one or more embodiments, the data domain management controller (200) is substantially similar to the data domain management controller (106). As such, it may include any number of computing devices to implement functionality described herein.

In one or more embodiments, an analyzer (202) is any hardware (e.g., circuitry), software, firmware, or any combination thereof that includes functionality to perform an analysis to yield a ranked list of backup jobs that are predicted to fail, the confidence associated with such predictions, and data items (i.e., variables) associated with a given backup job that may contribute, in whole or in part, to the predicted failure. For example, an analyzer (202) may be one or more processes executing on one or more processors of one or more computing devices of the data domain management controller (200).

In one or more embodiments, the analyzer (202) includes a data collector (206). In one or more embodiments, a data collector (206) is any hardware (e.g., circuitry), software, firmware, or any combination thereof that includes functionality to obtain data items (discussed above in the description of FIG. 1) associated with backup jobs for backing up data from client devices to backup storage devices. For example, a data collector (206) may be one or more processes executing on one or more processors of one or more computing devices of the data domain management controller (200).

In one or more embodiments, the analyzer (202) also includes a time series database (208). In one or more embodiments, a time series database (208) is a data repository. In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location. In one or more embodiments, a time series database (208) is a database that records entries as a series of sets of data items associated with a backup job performed at a given time, and whether or not the backup job performed at that time was a success or failure. In one or more embodiments, a time series database (208) stores entries for series of backups associated with a backup job that have all been successful, and entries for series of backups associated with a backup job that ended up with a failure. For the former, all data items for the series of successful backups may be stored. For the latter, data items prior to the failure may be omitted from the entry, and the amount of time (e.g., the time window) for which data items after a failure are discarded may be configured by a data domain administrator.

In one or more embodiments, the analyzer (202) includes an analytics engine (210). In one or more embodiments, an analytics engine (210) is any hardware (e.g., circuitry), software, firmware, or any combination thereof that includes functionality to analyze data items (discussed above in the description of FIG. 1) associated with backup jobs for backing up data from client devices to backup storage devices. For example, a data collector (206) may be one or more processes executing on one or more processors of one or more computing devices of the data domain management controller (200). In one or more embodiments, the analytics engine (210) includes functionality to assess future backup jobs based on the aforementioned data items of previous backups to make a prediction as to whether they might fail within a time window, assign a confidence to the predictions, rank the predicted failures based on the confidences, and determine what data items (i.e., variables) may contribute to the future backup job failures.

In one or more embodiments, the analytics engine (210) includes a failure predictor (212). In one or more embodiments, a failure predictor (212) is any hardware (e.g., circuitry), software, firmware, or any combination thereof that includes functionality to use the aforementioned data items obtained by data collector (206) and stored in the time series database (208) to predict whether a planned future backup job will fail within a given and/or configured time window. In one or more embodiments, the failure predictor uses any machine learning algorithm to make the prediction. For example, a nearest neighbor algorithm may be used to make the prediction. Such a prediction may be made, for example, by comparing the data items associated with a given instance of a backup to be made pursuant to a planned backup job execution to the set of backup instances for the backup job stored in the time series database (208). In one or more embodiments, if the planned backup instance comparison is above (or below) a defined threshold, then the failure predictor (212) predicts that the planned backup will fail within the defined time window.

In one or more embodiments, the analytics engine (210) also includes a failure prioritizer (214). In one or more embodiments, a failure prioritizer (214) is any hardware (e.g., circuitry), software, firmware, or any combination thereof that includes functionality to use the aforementioned data items obtained by data collector (206) and stored in the time series database (208), along with the predictions of failure made by the failure predictor (212), to assign a confidence value to the prediction. In one or more embodiments, the failure prioritizer uses a transductive confidence machine to assign a confidence to each prediction. Such confidence may be assigned, for example, by assessing data items associated with planned backup instances for backup jobs against the set of data for failed backup instances in the time series database (208) that failed actually failed within the time window defined by the data domain administrator.

In one or more embodiments, the analytics engine (210) also includes a parameter predictor (216). In one or more embodiments, a parameter predictor (216) is any hardware (e.g., circuitry), software, firmware, or any combination thereof that includes functionality to use the aforementioned data items obtained by data collector (206) and stored in the time series database (208), along with the predictions of failure made by the failure predictor (212), to determine which parameters (i.e., variables, data items) associated with a given backup instance of a backup job may contribute to the future failure of the backup within the time window. Such a determination may be made, for example, using an exchangeability test to determine a variation for a given data item between the values of the data item in the time series database. In one or more embodiments, the exchangeability test is performed using martingales. In one or more embodiments, use of martingales determines if a value in a sequence of values varies from the expectation of its value based on prior values for a data item.

In one or more embodiments, the data domain management controller (200) also includes a manager (204). In one or more embodiments, a manager (204) is any hardware (e.g., circuitry), software, firmware, or any combination thereof that includes functionality to receive the results of the analyses performed by the analyzer (202).

In one or more embodiments, the data domain management controller (200) includes a failure prediction receiver (218). In one or more embodiments, a failure prediction receiver (218) is any hardware (e.g., circuitry), software, firmware, or any combination thereof that includes functionality to receive the results of the analyses performed by the analyzer (202), and to organize such results into a data structure. For example, the data structure may be a table that includes a client device identifier, a backup job identifier, information indicating that a future backup instance associated with the backup job is predicted to fail, a confidence parameter that the prediction is correct, and a listing of variables that may contribute to said failure per backup job instance. In one or more embodiments, the listing of possible failures is ranked, with the jobs having the highest confidence value being highest on the this and the remaining backups being ranked in a descending manner thereafter.

In one or more embodiments, the data domain management controller (200) includes an alerter (220). In one or more embodiments, an alerter (220) is any hardware (e.g., circuitry), software, firmware, or any combination thereof that includes functionality to take the data structure created by the failure prediction receiver (218) and provide said results to an administrator. For example, the alerter (220) may be in communication with a computing device (not shown) that is configured to display, via a GUI, the results to a data domain administrator.

While FIG. 2 shows a configuration of components, other configurations may be used without departing from the scope of embodiments described herein. Accordingly, embodiments disclosed herein should not be limited to the configuration of components shown in FIG. 2.

Figure 3:
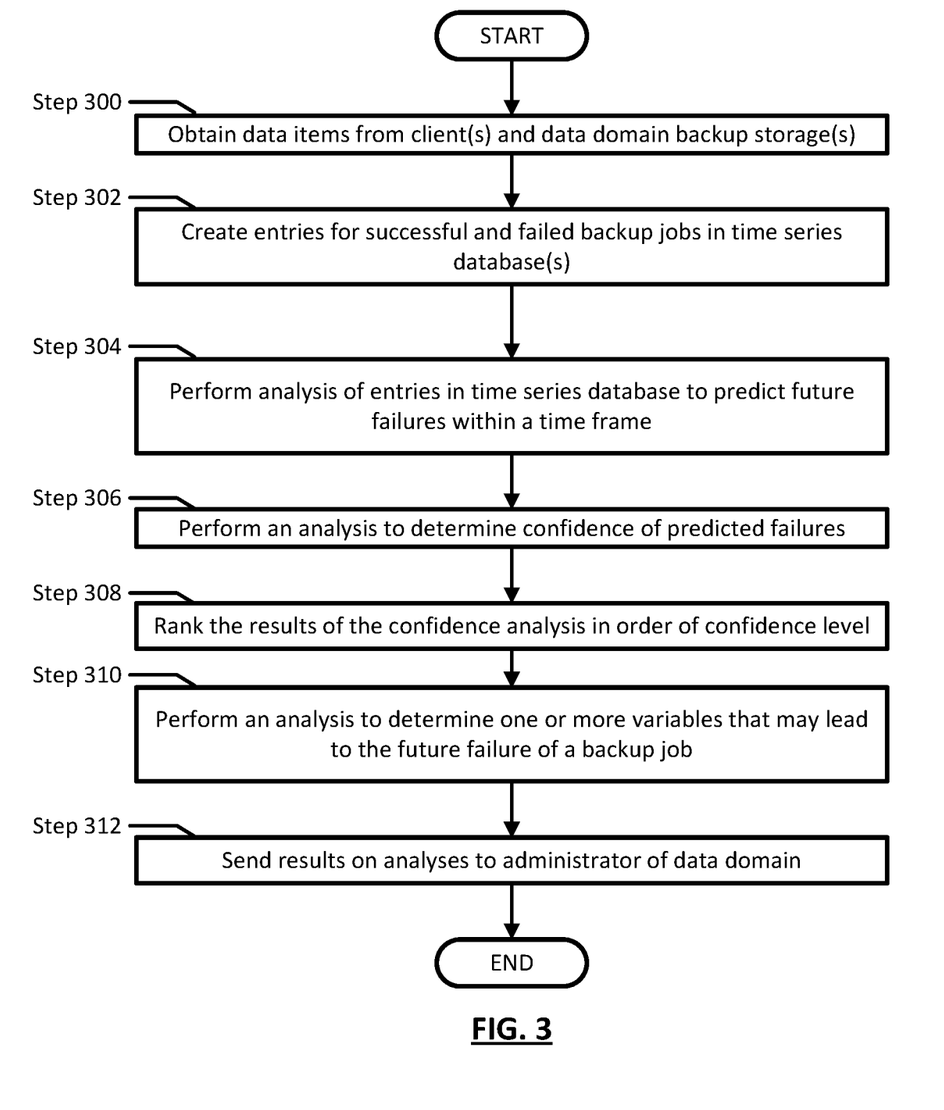
FIG. 3 shows a flowchart in accordance with one or more embodiments of the invention.

FIG. 3 shows a flowchart describing a method for predicting backup failures in accordance with one or more embodiments disclosed herein.

While the various steps in the flowchart shown in FIG. 3 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

In Step 300, data items associated with a backup instance associated with a backup job are obtained. In one or more embodiments, any number of sets of such data items may be obtained, each associated with a respective backup instance. As discussed above in the description of FIG. 1, such data items may include, but are not limited to: storage capacity; system model; operating system version information; a set of data collections and/or types to be backed up; whether or not data is encrypted by the client; whether or not data is to be encrypted when stored by a storage device; backup media type (disk, tape, etc.); whether or not garbage collection services are running; number of concurrent backups from clients and/or to storage devices; storage characteristics (e.g., information about type of media used for backup, age of media, various attributes of the media, etc.); system model information (e.g., cluster information, generation of system, machine check exception history); information regarding updates and fixes made to an operating system after deployment of the operating system; and/or backup set and encryption engine information (e.g., AES, TME, MKTME, algorithms used, etc.). Other types of data items may be used without departing from the scope of embodiments described herein. In one or more embodiments, such data items are obtained by a data collector of a data domain management controller.

In Step 302, information (including data items) are stored in a time series database. In one or more embodiments, series of backup instances for a given backup job that are successful are timestamped, labeled as successful, and stored with associated data items. In one or more embodiments, if a backup instance fails, then the instance is labeled as failed, timestamped, and stored. In one or more embodiments, the data items stored may include data items prior to a defined time window (e.g., a time window configured by an administrator). For example, an administrator may want to have time series database entries for failed backup instances discard date items for twenty minutes prior to the failure, so that analysis of the failed backup instances can determine information about the state of the client devices and backup storage devices twenty minute prior to failure when predicting if a given backup job is likely to fail within a twenty-minute time window.

In Step 304, a first analysis is performed for a future backup instance of a backup job using the failed backup entries in the time series database. Such an analysis may use any machine learning algorithm, which may use the failed entries in the time series database as a training data set and the future backup instance as the case that is being tested against that training set. One example of a machine learning algorithm that may be used in accordance with embodiments described herein is a nearest neighbor analysis. Other machine learning algorithms may be used without departing from the scope of embodiments described herein. In one or more embodiments, the results of an analysis of a future backup instance is a prediction of whether, according to the machine learning algorithm, the backup instance is predicted to be successful, or to fail.

In Step 306, for the future backup instances predicted to fail in Step 304, a second analysis is performed to determine a confidence associated with the failure prediction. In one or more embodiments, any prediction confidence scheme may be used to determine the confidence level of a given prediction. One non-limiting example of such a scheme is a transductive confidence machine. In one or more embodiments, such a scheme assesses a future backup instance against the information in the time series database to determine that, for backup instances having similar sets of data items, whether the backup instance actually failed. In one or more embodiments, the more often a failure occurred, the higher the confidence assigned that the backup instance being assessed will similarly fail within the defined time window.

In Step 308, the predicted failures are ranked based on the confidence levels assigned in Step 306. For example, an assessment of ten future backup instances that were predicted to fail in Step 304 yields a confidence level of each prediction. In one or more embodiments, the predicted failure having the highest confidence value is at the top of the ranking, with each subsequent entry in the ranking having a progressively lower confidence value.

In Step 310, a third analysis is performed to determine which data items associated with a backup instance being analyzed are likely to contribute to the predicted failure of the backup instance. In one or more embodiments, such an analysis is an exchangeability test. Such a test may, for example, be performed using plugin-martingales. In such an analysis, each data item (i.e., variable) associated with a given future backup instance that is predicted to fail is assessed against the historical set of such data items in the time series database. In one or more embodiments, for a given data item, its value relative to the range of the data items in the time series database is assessed. In one or more embodiments, if the data item is determined to vary from the set beyond a threshold value, which may be user defined, then the variable is considered to be a potential contributing factor to the predicted future failure of the backup instance.

In Step 312, the results of the aforementioned analyses are sent to an administrator of a data domain. In one or more embodiments, the results include a client identifier of the client from which information is to be backed up, a job identifier identifying the particular backup job (or instance thereof) that is predicted to fail, the prediction of failure, the confidence value assigned to the prediction, and the one or more data items (i.e., variables) predicted to potentially contribute to the future failure. In one or more embodiments, the results may be provided to an administrator in any way that a collection of data can be presented. For example, the administrator may be provided a table of entries. Such a table may include a listing of each future backup job instance predicted to fail, ranked according to the confidence level of the prediction, with each entry including a listing of the variables assessed to be possible contributing factors to the predicted future failure. In one or more embodiments, such a table may be presented to an administrator as part of a GUI used by the administrator to manage one or more data domains.

In one or more embodiments, providing the results to an administrator allows the administrator an opportunity to take remedial actions. For example, an administrator may assess that the predicted failure with the highest confidence level (i.e., the predicted failure at the top of the ranking) requires remedial action to mitigate the predicted failure. In such an example, the variable likely to contribute to the future failure may be that an update has not yet been made to an operating system. Accordingly, the administrator may make the relevant operating system update to avoid the predicted failure. As another example, the administrator may discern that many of the predicted failures on the ranked list include a variable that may lead to the failure as being a particular system model of backup storage devices. Accordingly, the administrator may choose to replace such models with different models to try and avoid additional backup failures on an on-going basis.

Figure 4:
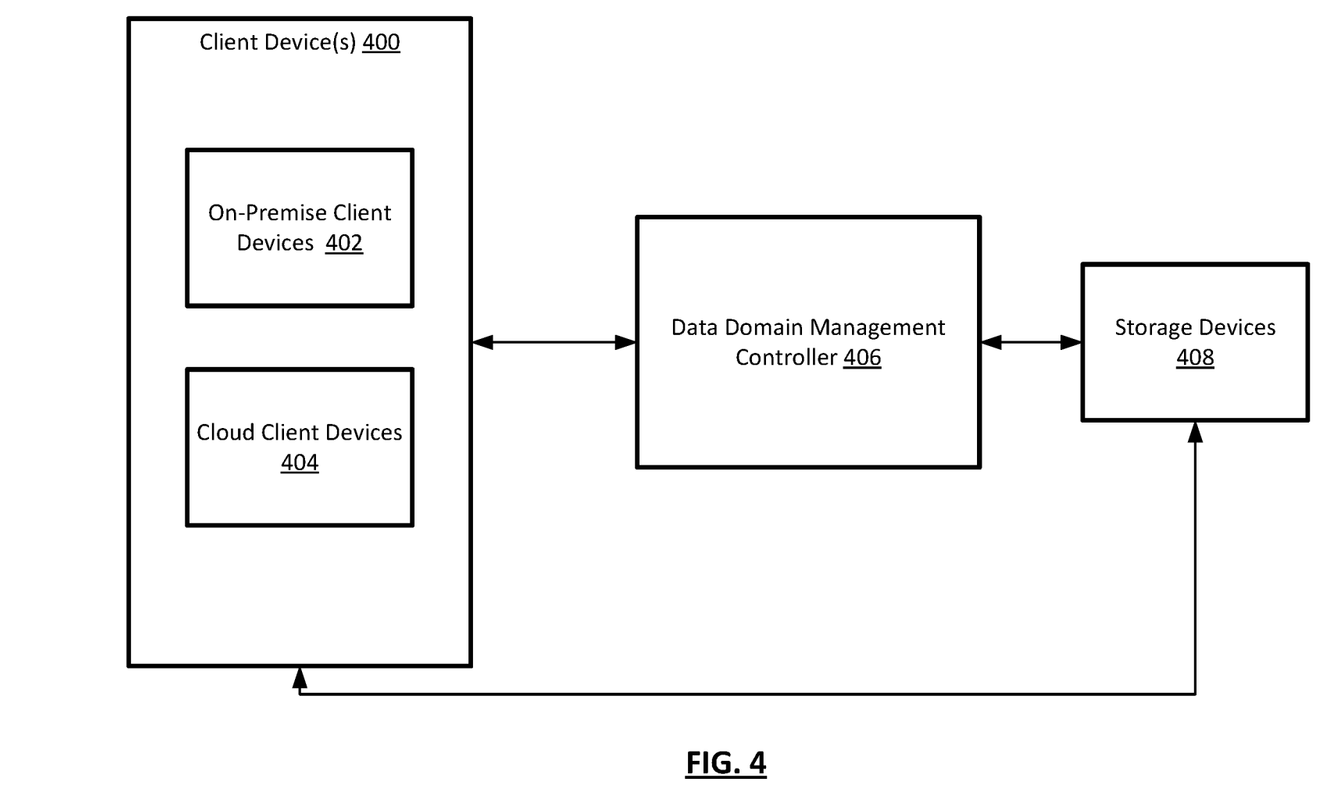
FIG. 4 shows an example in accordance with one or more embodiments of the invention.

FIG. 4 shows an example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example.

Referring to FIG. 4, consider a scenario in which a set of client devices (400) within a data domain include a set of client devices that are at a location of a particular entity (e.g., on-premise client devices (402)) and another set that are located in a cloud of a cloud service provider (e.g., cloud client devices (404)). The collection of client devices (400) may represent all or part of a data domain. In one or more embodiments, the client devices (400) are operatively connected to a set of storage devices (408) to which client data is backed up periodically via a series of backup jobs. In one or more embodiments, the backup of data from client devices (400) to storage devices (408) is managed by a data domain management controller (406).

In the aforementioned scenario, the data domain management controller (406), stores entries in a time series database. If a given backup job is successful, the backup job instance is added to the time series database with an indication of the success, and a set of data items associated with the successful backup instance. If the backup job instance is a failure, the entry in the time series database may be modified to exclude data items for prior instances within a time window configured by an administrator (e.g., ten minutes).

Next, the data domain management controller assesses a set of planned future backup instances that are to occur within the defined time window. A nearest neighbor algorithm is used to predict a subset of the backup job instances may fail.

Next, a transductive confidence machine is used to assign a confidence level to the previously made failure predictions, and an exchangeability test is performed to determine what data items may be contributing factors to the predicted failure.

Next, a set of data entries is created to represent the results of the aforementioned analyses. Such a set of data entries may, for example, appear as follows:

| Client Identifier | Backup Job Instance Identifier | Predicted Outcome | Confidence Level | Date Items Predicted to Contribute to Failure |
|---|---|---|---|---|
| 1134 | A0023 | Fail | 0.952 | DI-2 |
| 3245 | QP021 | Fail | 0.918 | DI-3; DI-1 |
| 7645 | L019P | Fail | 0.869 | DI-1 |
| 8712 | 01RQ8 | Fail | 0.738 | DI-1 |
| 9127 | LK52H | Fail | 0.672 | DI-1 |

In one or more embodiments, the above table is presented to an administrator of a data domain via a GUI. In one or more embodiments, based on the above information, the administrator makes a decision to take two separate remedial actions.

The first remedial action is based on the 95% confidence level assigned to the predicted failure of backup job instance A0023 for client 1134. DI-2 is a data item indicating that a garbage collection services is being performed in association with that backup instance. Accordingly, to prevent a future failure of the backup instance within the next 10 minutes, the administrator disables garbage collection, thereby proactively preventing the failure.

The second remedial action is based on the administrator discerning that the other four ranked backup jobs, all of which have a confidence level of future failure higher than 67%, include DI-1 as a potential factor contributing to the future failure. DI-1 is a version of an operating system that is older than a currently available version. Accordingly, though the administrator may not be able to prevent the failures within the next ten minutes, the administrator makes the relevant operating system updates to prevent additional backup instance failures moving forward.

Figure 5:
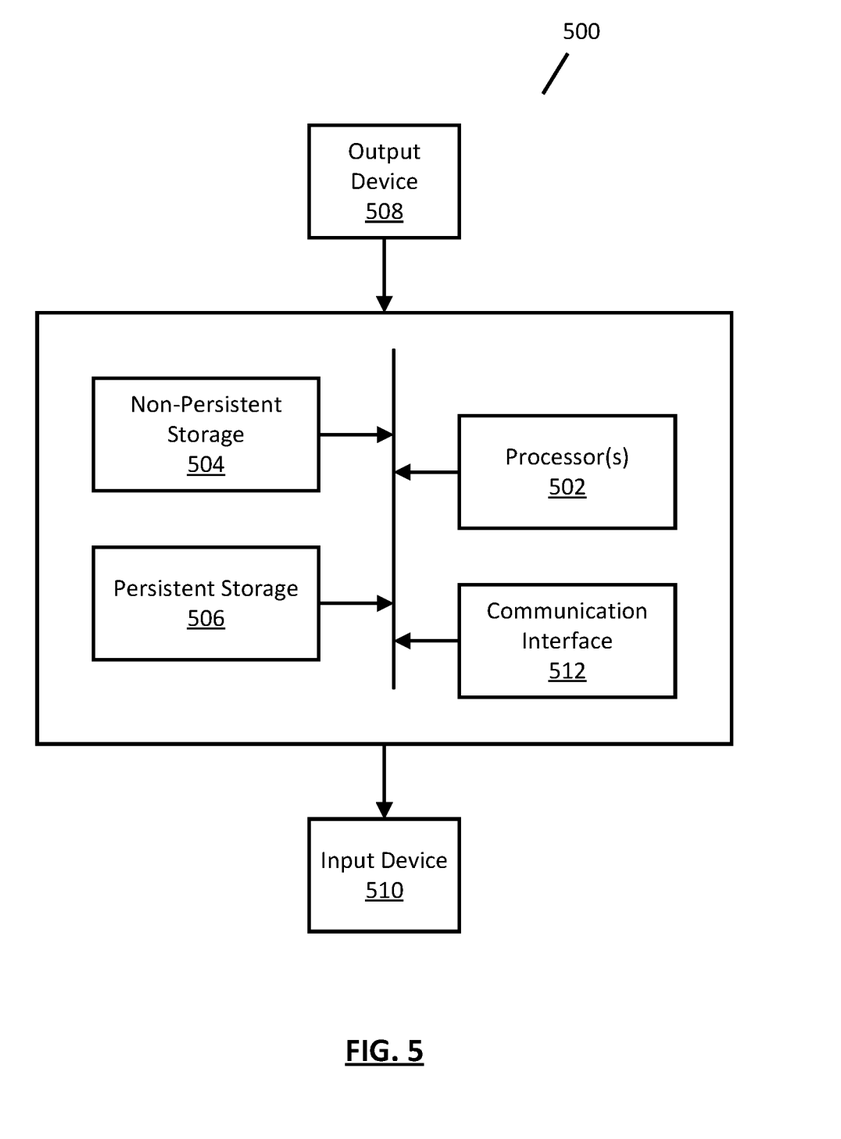
FIG. 5 shows a computing system in accordance with one or more embodiments of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed above should be understood as being examples of problems solved by embodiments of the invention of the invention and the invention should not be limited to solving the same/similar problems. The disclosed invention is broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for forecasting backup failures, the method comprising:
   obtaining a plurality of data items associated with a plurality of backup jobs;
   writing a plurality of entries in a time series database, the plurality of entries comprising successful backup jobs and failed backup jobs;
   performing a first analysis to predict a plurality of future backup job failures based on the plurality of entries in the time series database to obtain a plurality of future backup job failure predictions;
   performing a second analysis to determine a confidence prediction for each of the predicted plurality of future backup job failures, wherein the second analysis comprises a transductive confidence machine analysis;
   ranking the predicted plurality of future backup job failures based on the second analysis;
   performing a third analysis to determine at least one variable leading to each of the predicted plurality of future backup job failures, wherein the third analysis comprises an exchangeability test; and
   sending results of the second analysis and the third analysis to an administrator of a data domain.

2. The method of claim 1, wherein a first portion of the plurality of data items is associated with a client device and a second portion of the plurality of data items is associated with a backup storage device of the data domain.

3. The method of claim 1, wherein the plurality of entries in the time series database comprises a chronological series of entries for each of a series of backup jobs associated with a client device.

4. The method of claim 1, wherein the failed backup jobs of the plurality of entries comprise information prior to a time window configured by administrator.

5. The method of claim 1, wherein the first analysis comprises a nearest neighbor analysis.

6. The method of claim 1, wherein the exchangeability test comprises an analysis using martingales.

7. The method of claim 6, wherein, when the third analysis yields a result over a threshold, the at least one variable is selected.

8. The method of claim 1, wherein the results comprise a client identifier, a job identifier, a ranking among predicted failures, and the at least one variable.

9. The method of claim 1, wherein, in response to receiving the results, the administrator initiates a remedial action.

10. The method of claim 9, wherein the remedial action prevents a future backup job failure before a failure occurs.

11. The method of claim 9, wherein the remedial action comprises a set of actions to prevent a plurality of future backup job failures.

12. The method of claim 1, further comprising displaying the results in a graphical user interface (GUI) to an administrator, wherein the GUI enables the administrator to select a first backup job of the plurality of backup jobs for which to perform a remedial action.

13. A non-transitory computer readable medium comprising computer readable program code, which when executed by a computer processor enables the computer processor to perform a method for forecasting backup failures, the method comprising:
  obtaining a plurality of data items associated with a plurality of backup jobs;
  writing a plurality of entries in a time series database, the plurality of entries comprising successful backup jobs and failed backup jobs;
  performing a first analysis to predict a plurality of future backup job failures based on the plurality of entries in the time series database to obtain a plurality of future backup job failure predictions;
  performing a second analysis to determine a confidence prediction for each of the predicted plurality of future backup job failures, wherein the second analysis comprises a transductive confidence machine analysis;
  ranking the predicted plurality of future backup job failures based on the second analysis;
  performing a third analysis to determine at least one variable leading to each of the predicted plurality of future backup job failures, wherein the third analysis comprises an exchangeability test; and
  sending results of the second analysis and the third analysis to an administrator of a data domain.

14. The non-transitory computer readable medium of claim 13, wherein a first portion of the plurality of data items is associated with a client device and a second portion of the plurality of data items is associated with a backup storage device of the data domain.

15. The non-transitory computer readable medium of claim 13, wherein the plurality of entries in the time series database comprises a chronological series of entries for each of a series of backup jobs associated with a client device.

16. The non-transitory computer readable medium of claim 13, wherein the first analysis comprises a nearest neighbor analysis.

17. The non-transitory computer readable medium of claim 13, further comprising displaying the results in a graphical user interface (GUI) to an administrator, wherein the GUI enables the administrator to select a first backup job of the plurality of backup jobs for which to perform a remedial action.

18. A system for forecasting backup failures, the system comprising:
  a plurality of client devices each comprising a processor, a memory, and a persistent storage device;
  a plurality of storage devices; and
  a data domain management controller operatively connected to the plurality of client devices and the plurality of storage devices, and configured to:
    obtain a plurality of data items associated with a plurality of backup jobs;
    write a plurality of entries in a time series database, the plurality of entries comprising successful backup jobs and failed backup jobs;
    perform a first analysis to predict a plurality of future backup job failures based on the plurality of entries in the time series database to obtain a plurality of future backup job failure predictions;
    perform a second analysis to determine a confidence prediction for each of the predicted plurality of future backup job failures, wherein the second analysis comprises a transductive confidence machine analysis;
    rank the predicted plurality of future backup job failures based on the second analysis;
    perform a third analysis to determine at least one variable leading to each of the predicted plurality of future backup job failures, wherein the third analysis comprises an exchangeability test; and
    send results of the second analysis and the third analysis to an administrator of a data domain.

* * * * *